(12) United States Patent
Baker et al.

(10) Patent No.: US 12,472,707 B2
(45) Date of Patent: Nov. 18, 2025

(54) PORE PLACEMENT DETERMINATIONS USING ANCHOR POINTS

(71) Applicant: Peridot Print LLC, Palo Alto, CA (US)

(72) Inventors: Mary Gray Baker, Palo Alto, CA (US); Nathan Eric Shirley, Vancouver, WA (US); Ronnie George Parsons, Portland, OR (US)

(73) Assignee: PERIDOT PRINT LLC, Palo Alto, CA (US)

( * ) Notice: Subject to any disclaimer, the term of this patent is extended or adjusted under 35 U.S.C. 154(b) by 391 days.

(21) Appl. No.: 18/023,365

(22) PCT Filed: Sep. 22, 2020

(86) PCT No.: PCT/US2020/052055
§ 371 (c)(1),
(2) Date: Feb. 26, 2023

(87) PCT Pub. No.: WO2022/066150
PCT Pub. Date: Mar. 31, 2022

(65) Prior Publication Data
US 2023/0302748 A1 Sep. 28, 2023

(51) Int. Cl.
*B29C 70/54* (2006.01)
*G06T 19/20* (2011.01)

(52) U.S. Cl.
CPC ............ *B29C 70/548* (2013.01); *G06T 19/20* (2013.01); *G06T 2219/2021* (2013.01)

(58) Field of Classification Search
CPC ................. B29C 70/548; G06T 19/20; G06T 2219/2021; G06F 2113/10; G06F 2113/22; B33Y 80/00
See application file for complete search history.

(56) References Cited

U.S. PATENT DOCUMENTS

| 6,628,279 B1 | 9/2003 | Schell et al. | |
| 2004/0070582 A1* | 4/2004 | Smith | A61B 8/483 345/419 |

(Continued)

FOREIGN PATENT DOCUMENTS

| CN | 101298746 A | 11/2008 |
| CN | 109881538 A | 6/2019 |

(Continued)

OTHER PUBLICATIONS

Lye et al., "Computer-assisted mould design for styrofoam products", Computers in industry, vol. 18, Issue. 2, Feb. 1992, pp. 117-126.

*Primary Examiner* — Nicholas Klicos
(74) *Attorney, Agent, or Firm* — Michael Dryja (57) ABSTRACT

According to examples, a processor may place anchor points at determined locations of a digital model of an item to be fabricated by a three-dimensional (3D) fabrication system. The anchor points may include points that remain in place during a placement determination of pores on the digital model and may correspond to locations at which pores are or are not to be formed in the digital model. The processor may determine places at which the pores are to be set in the digital model of the item, in which the pores are to be placed to comply with a predefined constraint with respect to each other and the anchor points and may modify the digital model to place the pores at the determined places in the digital model and to add pores at anchor points that correspond to pores in the digital model.

14 Claims, 6 Drawing Sheets

(56) References Cited

U.S. PATENT DOCUMENTS

| | | |
|---|---|---|
| 2007/0007699 A1 | 1/2007 | Rynerson et al. |
| 2009/0256842 A1 | 10/2009 | Bohman et al. |
| 2016/0023311 A1* | 1/2016 | Arbesman ............. B23P 15/246 |
| | | 29/432 |
| 2017/0132838 A1 | 5/2017 | Lipp et al. |
| 2018/0056607 A1 | 3/2018 | Socha-Leialoha |
| 2018/0072040 A1* | 3/2018 | Mark et al. |
| 2018/0093418 A1* | 4/2018 | Lappas ................. B33Y 50/02 |
| 2018/0095450 A1* | 4/2018 | Lappas ................. B33Y 10/00 |
| 2020/0004225 A1* | 1/2020 | Buller ...................... B22F 5/04 |
| 2021/0267742 A1* | 9/2021 | Chhaya ................ B29C 64/386 |

FOREIGN PATENT DOCUMENTS

| | | |
|---|---|---|
| DE | 102018003447 A1 | 10/2019 |
| WO | 2018/237279 A1 | 12/2018 |

\* cited by examiner

PORE PLACEMENT DETERMINATIONS USING ANCHOR POINTS

BACKGROUND

Various types of products may be fabricated from a pulp of material. Particularly, a pulp molding die that includes a main body and a mesh may be immersed in the pulp of material and the material in the pulp may form into the shape of the main body and the mesh. The main body and the mesh may have a desired shape of the product to be formed. The complexity of the shape of the product to be formed depends largely on the accuracy with which the mesh may be crafted. The main body and the mesh may include numerous pores for liquid passage, in which the pores in the mesh may be significantly smaller than the pores in the main body. During formation of the product, a vacuum force may be applied through the pulp molding die which may cause the material in the pulp to be sucked onto the mesh and form into a shape that matches the shape of the pulp molding die. The material may be removed from the mesh and may be solidified, for example by drying, to have the desired shape.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

An automated approach to defining locations on items at which pores are to be formed may lead to some of the pores being placed at undesired locations. By way of example, automated approaches may cause pores to be positioned according to a set pattern across a surface of an item and thus, the automated approaches may cause pores to be placed at a sharp corner and/or a relatively thin section of the item. This may result in an item having a weak point, a part formed using the item to have a defect, or other issues.

Disclosed herein are computer-readable media, methods, and apparatuses in which a processor may place a plurality of anchor points at determined locations of a digital model of an item to be fabricated by a 3D fabricated system. The anchor points may include points that may remain in place during a placement determination of pores in the digital model of the item. In addition, the anchor points may correspond to locations at which pores are or are not to be formed in the digital model. The processor may also determine places at which the pores are to be set in the digital model of the item, in which the pores are to be placed to comply with a predefined constraint with respect to each other and the anchor points. That is, for instance, the processor may determine the places at which the pores are to be set with the anchor points being fixed at their determined locations and while meeting a predefined constraint, such as a predefined distance constraint, a predefined area constraint, and/or the like.

The processor may also modify the digital model to place the pores at the determined places in the digital model and to add pores at anchor points that correspond to pores in the digital model. In addition, the processor may prevent the addition of pores in the digital model at anchor points that correspond to locations at which pores are not to be formed.

According to examples, the item may be any of a forming mold, a forming screen, a transfer mold, and a transfer screen. As a result, the item may include pores and may be employed in the formation of wet parts from a slurry of a liquid and material elements, e.g., fibers. The wet parts may thus be formed of molded fiber. These types of devices may undergo a relatively high amount of pressure during a wet part forming operation and/or during a transfer operation of the wet part from the forming screen. Through implementation of the placements of the pores through use of the anchor points as disclosed in the present disclosure, the devices may better withstand these pressures and may thus be durable such that the devices may be employed over a long period of time.

As discussed above, automated placement determination of pores in items, such as screen devices, may result in technological issues, such as weak sections in the items, formation of parts with structural and/or design defects, and/or the like. A technological improvement afforded by the present disclosure may be that pores in items, such as devices that may be employed in the formation of wet parts from a slurry of material elements (e.g., molded fiber parts), may be placed to prevent the pores from causing the item to have structurally weak sections. In addition, the pores in the items may be placed to prevent the wet parts from being formed with defects caused by the pores. Instead, the placement of anchor points and the determination of the locations of pores with respect to the anchor points may enable the pores to be placed such that they avoid certain areas (or occupy certain areas), which may result in the improved performance of the items.

Figure 1:
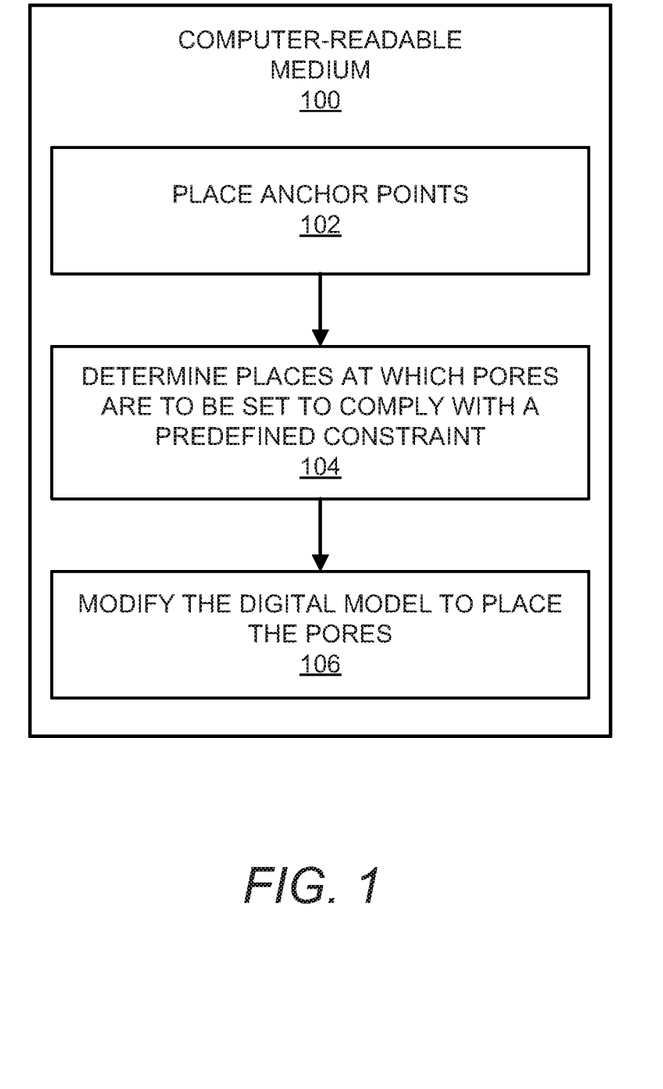
FIG. 1 shows a block diagram of an example computer-readable medium that may have stored thereon computer-readable instructions for determining placements of pores in an item to be fabricated by a 3D fabrication system based on placements of anchor points.
Figure 2:
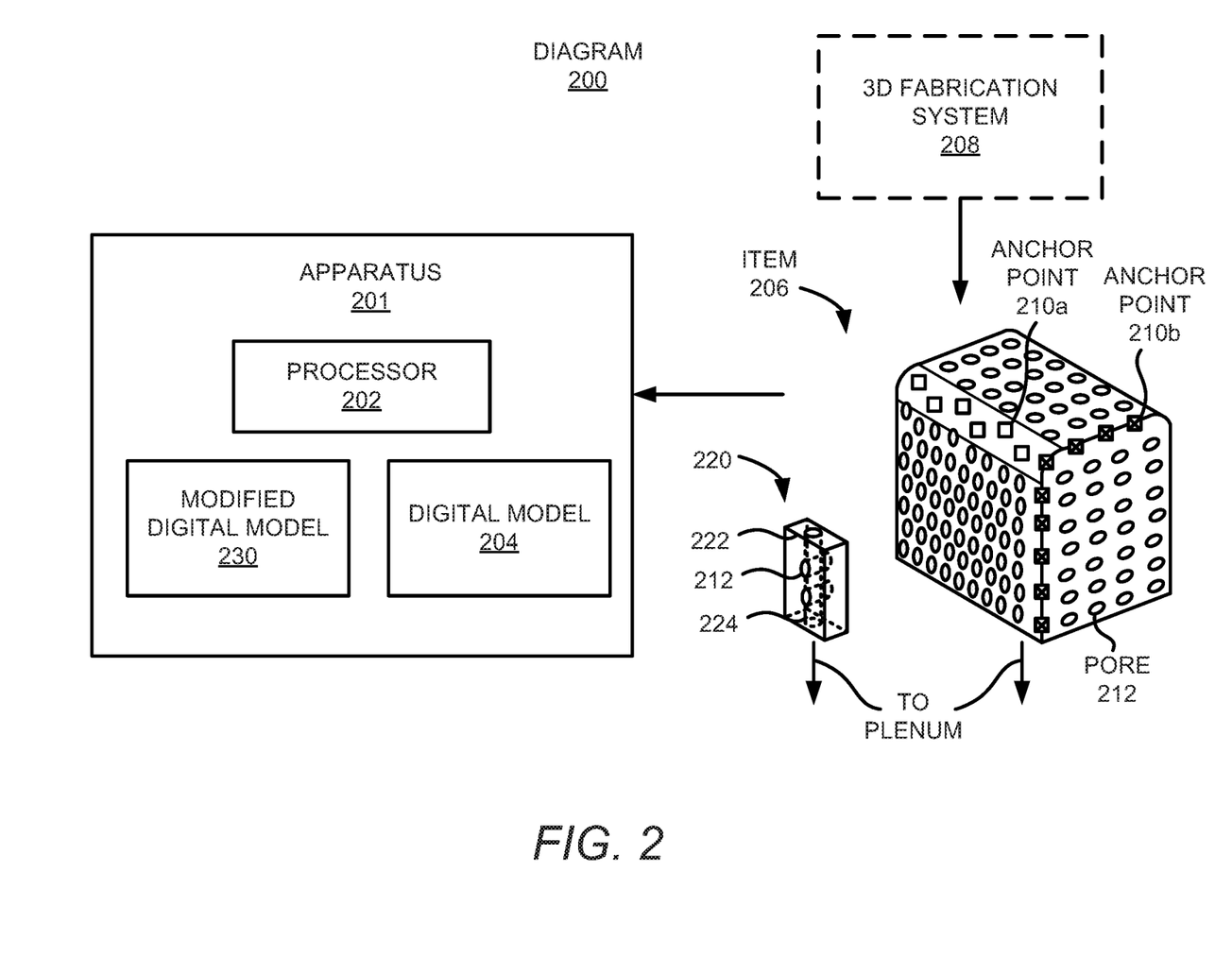
FIG. 2 shows a diagram, which includes an example processor that may execute the computer-readable instructions stored on the example computer-readable medium on the digital model of the item to generate a modified digital model.
Figure 3A:
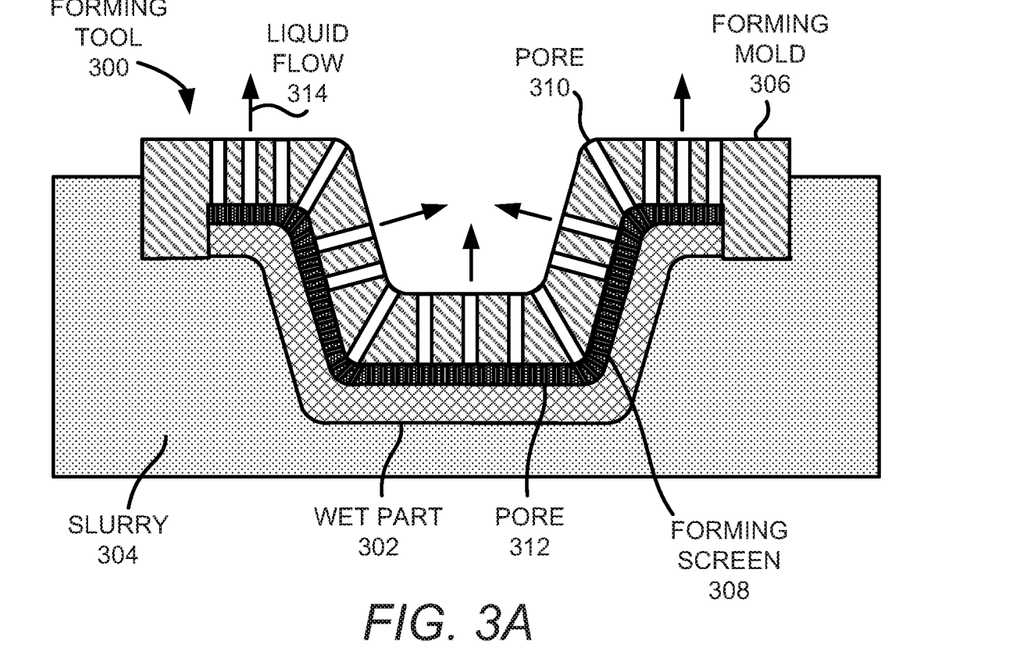
FIGS. 3A and 3B, respectively, depict, cross-sectional side views of an example forming tool and an example transfer tool.
Figure 3B:
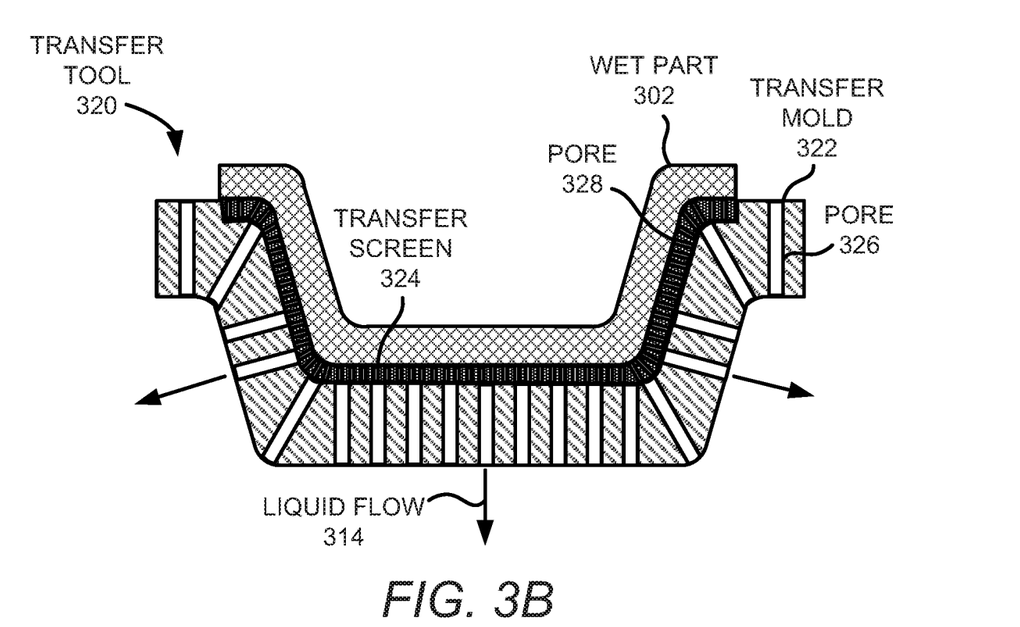
Figure 3C:
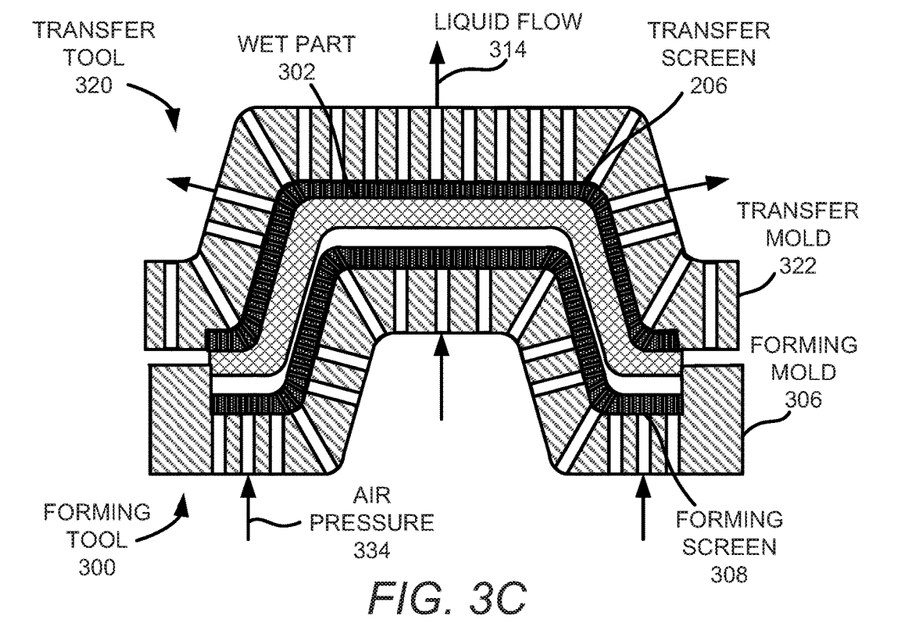
FIG. 3C shows a cross-sectional side view of the example forming tool and the example transfer tool depicted in FIGS. 3A and 3B during a removal by the example transfer tool of the wet part from the example forming tool.

Reference is first made to FIGS. 1, 2, and 3A-3C. FIG. 1 shows a block diagram of an example computer-readable medium 100 that may have stored thereon computer-readable instructions for determining placements of pores in an item to be fabricated by a 3D fabrication system based on placements of anchor points. FIG. 2 shows a diagram 200, which includes an example processor 202 that may execute the computer-readable instructions stored on the example computer-readable medium 100 on the digital model 204 of the item to generate a modified digital model 230. FIGS. 3A and 3B, respectively, depict, cross-sectional side views of an example forming tool 300 and an example transfer tool 320 and FIG. 3C shows a cross-sectional side view of the example forming tool 300 and the example transfer tool 320 during a removal by the example transfer tool 320 of the wet part 302 from the example forming tool 300. It should be understood that the example computer-readable medium 100 depicted in FIG. 1, the example processor 202 depicted in FIG. 2, and/or the example forming tool 300 and the example transfer tool 320 respectively depicted in FIGS. 3A-3C may include additional attributes and that some of the attributes described herein may be removed and/or modified without departing from the scopes of the example computer-readable medium 100, the example processor 202, and/or the example forming tool 300 and the example transfer tool 320.

The computer-readable medium 100 may have stored thereon computer-readable instructions 102-106 that a processor, such as the processor 202 depicted in FIG. 2, may execute. The computer-readable medium 100 may be an electronic, magnetic, optical, or other physical storage device that contains or stores executable instructions. The computer-readable medium 100 may be, for example, Random Access memory (RAM), an Electrically Erasable Programmable Read-Only Memory (EEPROM), a storage device, an optical disc, and the like. Generally speaking, the computer-readable medium 100 may be a non-transitory computer-readable medium, in which the term "non-transitory" does not encompass transitory propagating signals.

The processor 202 may fetch, decode, and execute the instructions 102 to place a plurality of anchor points 210a, 210b at determined locations of a digital model 204 of an item 206 to be fabricated by a three-dimensional (3D) fabrication system 208. The digital model 204 may be a computer aided design (CAD) file, or other digital representation of these components. In addition, the processor 202 may obtain (or equivalently, access, receive, or the like) the digital model 204 from a data store (not shown) or some other suitable source. In some examples, the digital model 204 may be generated using a CAD program or another suitable design program.

The anchor points 210a, 210b may identify locations, e.g., points and/or pores, that are to remain in place during a placement determination of pores 212 on the digital model 204 of the item 206. In addition, the anchor points 210a, 210b may correspond to different types of anchor points. A first type of the anchor points 210a may identify or correspond to locations at which pores are to be formed in the digital model 204 of the item 206. A second type of the anchor points 210b may identify or correspond to locations at which pores 212 are not to be formed in the digital model 204 of the item 206. In FIG. 2, the anchor points 210a that correspond to locations at which pores 212 are to be formed in the digital model 204 are depicted as having square shapes and the anchor points 210b that correspond to locations at which pores 212 are not to be formed in the digital model 204 are depicted as having square shapes with x's inside of the square shapes.

In some examples, the processor 202 may automatically determine the locations at which the anchor points 210a, 210b of the first type and/or the second type are to be placed in the digital model 204 according to a set of rules. For instance, the processor 202 may identify areas of the digital model 204 that meet a certain rule and may place an anchor point 210a, 210b of the first type and/or of the second type at those areas depending on the certain rule. By way of example, the processor 202 may determine a location of the digital model 204 having an inner radius of curvature that is below a predefined radius and may place an anchor point 210b of the second type at that location. For instance, the processor 202 may determine that the digital model 204 includes a relatively sharp corner and may place anchor points 210b of the second type along the corner such that the pores 212 are not placed along the corner as shown in FIG. 2. As another example, the processor 202 may determine that the digital model 204 includes a location that has a dimension that is below a predefined size and may place an anchor point 210b of the second type at that location.

As a further example, the processor 202 may determine a location of the digital model 204 having an inner radius of curvature that is within a predefined range of radii and may place anchor points 210a of the first type along that location as shown in FIG. 2. As a yet further example in which the digital model 204 includes a first portion and a second portion that is a mirror copy of the first portion, the processor 202 may determine an axis of symmetry between the first portion and the second portion and may place anchor points 210a, 210b of the first type or the second type along the determined axis of symmetry.

As a yet further example, the processor 202 may identify a portion 220 of the digital model 204 having a first surface 222 that includes a dimension that is below a predefined size. The predefined size may include, for instance, a size in which more than one pore may not fit on the first surface 222 without violating the predefined constraint. In this example, the processor 202 may place an anchor point 210a of the first type on the first surface 222 and may extend a channel 224 from the anchor point 210a through the identified portion 220. The processor 202 may also place a pore 212 that extends into the channel 224 along the identified portion 220.

The predefined radius, the predefined dimension, the predefined range of radii, the predefined size, and/or the like, may be determined based on testing and/or modeling of various items 206 having various types of features. By way of example, the predefined radius, predefined dimension, the predefined range of radii, the predefined size, and/or the like may be determined based on the pores 212 having radii of about 0.3 mm and minimum average cross sectional dimensions of around 0.2 mm, which may correspond to a minimum web thickness. In addition, or alternatively, the predefined radius, the predefined dimension, and/or the predefined range of radii may be user-defined, may depend on the type of the item 206, such as pore sizes and inter-pore distances as discussed above, or may depend on an environment in which the item 206 is to be employed, and/or the like.

In other examples, the processor 202 may determine the locations at which the anchor points 210 of the first type and/or the second type are to be placed in the digital model 204 according to instructions received from a user. That is, a user may instruct the processor 202 to place the anchor points 210 of the first type and/or the second type in the digital model 204 at certain locations of the digital model 204. In some examples, anchor points 210a of the first type may be placed around edges of the item 206 to ensure that the thickness of the wet part 302 may be substantially uniform throughout the item 206.

The processor 202 may fetch, decode, and execute the instructions 104 to determine places at which the pores 212 are to be set in the digital model 204 of the item 206, in which the pores 212 are to be placed to comply with a predefined constraint with respect to each other and the anchor points 210a, 210b. For instance, the processor 202 may execute a pore packing operation to determine the locations at which the pores 212 are to be placed in the digital model 204 of the item 206, while keeping the anchor points 210a, 210b in the locations at which they have been placed. In other words, the processor 202 may execute the pore packing operation around the placed anchor points 210a, 210b such that the anchor points 210a, 210b do not move, but instead, the pores 212 are placed with respect to the anchor points 210a, 210b and to each other such that the pores 212 comply with the predefined constraint.

By way of example, the processor 202 may implement a packing algorithm that may cause a maximum number of pores 212 to be added to the digital model 204 while causing the item 206 to have meet a predefined constraint, e.g., a certain level of mechanical strength. In some examples, the algorithm may be a sphere or ellipsoid packing algorithm or other suitable algorithm for determining placements of the pores 212.

The predefined constraint may be that distances between the pores 212 with respect to each other and the anchor points 210a, 210b may not fall below a predefined distance and/or that an area between the pores 212 may not fall below a predefined area. The predefined distance and/or predefined area may be determined through testing and/or modeling and may be set to cause the item 206 to have a certain level of mechanical strength, e.g., to prevent weak points. The predefined constraint may also include a constraint that a maximum number of pores 212 be placed while meeting other constraints. The predefined constraint may also or additionally include a constraint to cause a wet part 302 (discussed later herein) to be formed accurately. The processor 202 may also base the placements of the pores 212 on the properties (e.g., shapes and/or sizes) of the pores 212 and in some examples, the processor 202 may modify the properties of the pores 212.

The processor 202 may fetch, decode, and execute the instructions 106 to modify the digital model 204 to place the pores 212 at the determined places in the digital model 204 and to add pores at anchor points 210a that correspond to pores in the digital model 204 (e.g., first type of anchor points 210a). The processor may thus replace or insert pores 212 at the locations of the anchor points 210 that correspond to the first type of anchor points 210a and to prevent the addition of pores in the digital model 204 at the locations of the anchor points 210b that correspond to the second type of anchor points 210b.

The processor 202 may also send a modified digital model 230 to the 3D fabrication system 208, in which the 3D fabrication system 208 is to fabricate the item 206 with the plurality of pores 212 at the determined placements. Particularly, the processor 202 may send the modified digital model 230 to a controller or processor of the 3D fabrication system 208, which may process or otherwise use the modified digital model 230 to fabricate the item 206. In other examples, the processor 202 may be the controller or processor of the 3D fabrication system 208.

In some examples, the processor 202 may be part of an apparatus 201, which may be a computing system such as a server, a laptop computer, a tablet computer, a desktop computer, or the like. The processor 202 may be a semiconductor-based microprocessor, a central processing unit (CPU), an application specific integrated circuit (ASIC), a field-programmable gate array (FPGA), and/or other suitable hardware device. The apparatus 201 may also include a memory that may have stored thereon computer-readable instructions (which may also be termed computer-readable instructions) that the processor 202 may execute. The memory may be an electronic, magnetic, optical, or other physical storage device that contains or stores executable instructions. The memory may be, for example, Random Access memory (RAM), an Electrically Erasable Programmable Read-Only Memory (EEPROM), a storage device, an optical disc, and the like. The memory, which may also be referred to as a computer-readable storage medium, may be a non-transitory computer-readable storage medium, where the term "non-transitory" does not encompass transitory propagating signals.

The 3D fabrication system 208 may be any suitable type of additive manufacturing system. Examples of suitable additive manufacturing systems may include systems that may employ curable binder jetting onto build materials (e.g., thermally or UV curable binders), ink jetting onto build materials, selective laser sintering, stereolithography, fused deposition modeling, etc. In a particular example, the 3D fabrication system 208 may fabricate the item 206 by binding and/or fusing build material particles together. In any of these examples, the build material particles may be any suitable type of material that may be employed in 3D fabrication processes, such as, a metal, a plastic, a nylon, a ceramic, an alloy, and/or the like. Generally speaking, higher functionality/performance transfer screens 324 may be those with the smallest pore size to block fibers of smaller sizes, and hence some 3D fabrication system technologies may be more suited for generating the transfer screens 324 than others.

According to examples, the item 206 may be a device that may be employed in the fabrication of a wet part 302 from a slurry 304 of a liquid and material elements. In some examples, the liquid may be water or another type of suitable liquid in which pulp material, e.g., paper, wood, fiber crops, bamboo, or the like, may be mixed into the slurry 304. The material elements may be, for instance, fibers of the pulp material.

Reference is now made to FIGS. 3A-3C. FIG. 3A shows a cross-sectional side view of a forming tool 300, in which a portion of the forming tool 300 has been depicted as being placed within a volume of the slurry 304. FIG. 3B shows a cross-sectional side view of the transfer tool 320 that may remove the wet part 302 from the forming screen 308. FIG. 3C shows a cross-sectional side view of the forming tool 300 and the transfer tool 320 during a removal by the transfer tool 320 of the wet part 302 from the forming tool 300. The forming tool 300 and the transfer tool 320 may collectively form a fiber pulp molding tool set.

As shown in FIG. 3A, the forming tool 300 may include a forming mold 306 and a forming screen 308, in which the forming screen 308 may overlay the forming mold 306. As shown in FIG. 3B, the transfer tool 320 may include a transfer mold 322 and a transfer screen 324. In some examples, the forming screen 308 and the transfer screen 324 may be fabricated by a 3D fabrication system 208. The forming mold 306 and the transfer mold 322 may also be fabricated by the 3D fabrication system 208. In any regard, the item 206 discussed above may be any of the forming mold 306, the forming screen 308, the transfer mold 322, and the transfer screen 324. Particularly, the item 206 may be a molded fiber screen, in which the molded fiber screen may be the forming screen 308 and/or the transfer screen 324. In some examples, however, the transfer tool 320 may not include the transfer screen 324.

In some examples, the forming mold 306 and/or the transfer mold 322 may be removably mounted onto respective supporting structures (not shown) such that, for instance, the forming mold 306 may be moved independently from the transfer mold 322. Moreover, the forming mold 306 and the forming screen 308 may be fabricated to have shapes to which the wet part 302 may be molded when formed on the forming screen 308. Likewise, the transfer mold 322 and the transfer screen 324 may be fabricated to have shapes that may engage multiple surfaces of the wet part 302 formed on the forming screen 308. The transfer screen 324 may have a shape that is complementary to the shape of the forming screen 308.

As shown, the forming mold 306 may be formed to have a relatively larger thickness than the forming screen 308 and the transfer mold 322 may be formed to have a relatively larger thickness than the transfer screen 324. In some examples, the transfer screen 324 and the forming screen 308 may have the same or similar thicknesses and/or the transfer mold 322 and the forming mold 306 may have the same or similar thicknesses. The larger thicknesses of the forming mold 306 and the transfer mold 322 may cause the forming mold 306 and the transfer mold 322 to be substantially more rigid than the forming screen 308 and the transfer screen 324. The forming mold 306 may provide structural support for the forming screen 308 and the transfer mold 322 may provide structural support for the transfer screen 324.

The forming mold 306 and/or the forming screen 308 may include an attachment mechanism (or attachment device) for the forming screen 308 to be mounted to the forming mold 306. Likewise, the transfer mold 322 and/or the transfer screen 324 may include an attachment mechanism (or attachment device) for the transfer screen 324 to be mounted to the transfer mold 322. In either case, the mechanism may include mechanical fasteners, detents, and/or the like to enable the forming screen 308 to be removably mounted onto the forming mold 306 and/or the transfer screen 324 to be removably mounted onto the transfer mold 322. The mechanism that mounts the forming screen 308 to the forming mold 306 and/or that mounts the transfer screen 324 to the transfer mold 322 may be a quick release mechanism to enable the forming screen 308 and/or the transfer screen 324 to easily be released from the respective forming mold 306 and transfer mold 322. This may facilitate replacement of the forming screen 308 and/or the transfer screen 324 for maintenance purposes and/or for screens 308, 324 having different features to be employed in the formation of wet parts 302.

As also shown in FIGS. 3A-3C, each of the forming mold 306, the forming screen 308, the transfer mold 322, and the transfer screen 324 may include respective pores 310, 312, 326, 328 that may extend completely through respective top and bottom surfaces of the forming mold 306, the forming screen 308, the transfer mold 322, and the transfer screen 324. The pores 312, 328 respectively in the forming screen 308 and the transfer screen may be significantly smaller than the pores 310, 326 respectively in the forming mold 306 and the transfer mold 322. In addition, a plurality of structural features, such as pillars 330 (shown in FIG. 3D) may be provided between the surfaces of the forming mold 306 and the forming screen 308 and between the transfer mold 322 and the transfer screen 324 that are respectively adjacent and face each other to enable liquid to flow laterally between the forming mold 306 and the forming screen 308 and between the transfer mold 322 and the transfer screen 324. As some of the pores 312 in the forming screen 308 may not directly align with the pores 310 in the forming mold 306 and some of the pores 328 in the transfer screen 324 does not directly align with the pores 326 in the transfer mold 322, the channels 332 formed by the structural features may enable liquid to flow through those pores 312, 328 in addition to the pores 312, 328 that are directly aligned with respective the pores 310, 326.

Although not shown, the forming tool 300 may be in communication with a plenum to which a vacuum source may be connected such that the vacuum source may apply a vacuum pressure through the pores 310, 312 in the forming mold 306 and the forming screen 308. When the vacuum pressure is applied through the pores 310, 312, some of the liquid in the slurry 304 may be suctioned through the pores 310, 312 and may flow into the plenum as denoted by the arrows 314. As the liquid flows through the pores 310, 312, the forming screen 308 may prevent the material elements in the slurry 304 from flowing through the pores 312. That is, the pores 312 may have sufficiently small dimensions, e.g., diameters or widths, that may enable the liquid to flow through the pores 312 while blocking the material elements from flowing through the pores 312. In one regard, the diameters or widths of the pores 312 may be sized based on sizes of the material elements, e.g., fibers, in the slurry 304.

Over a period of time, which may be a relatively short period of time, e.g., about a few seconds, less than about a minute, less than about five minutes, or the like, the material elements may build up on the forming screen 308. Particularly, the material elements in the slurry 304 may be accumulated and compressed onto the forming screen 308 into the wet part 302. The wet part 302 may take the shape of the forming screen 308. In addition, the thickness and density of the wet part 302 may be affected by the types and/or sizes of the material elements in the slurry 304, the length of time that the vacuum pressure is applied while the forming mold 306 and the forming screen 308 are placed within the volume of the slurry 304, etc. That is, for instance, the longer that the vacuum pressure is applied while the forming mold 306 and the forming screen 308 are partially immersed in the slurry 304, the wet part 302 may be formed to have a greater thickness.

After a predefined period of time, e.g., after the wet part 302 having desired properties has been formed on the forming screen 308, the forming mold 306 and the forming screen 308 may be removed from the volume of slurry 304. For instance, the forming mold 306 may be mounted to a movable mechanism that may move away from the volume of slurry 304. In some examples, the movable mechanism may rotate with respect to the volume such that rotation of the movable mechanism may cause the forming mold 306 and the forming screen 308 to be removed from the volume of slurry 304. In other examples, the movable mechanism may be moved laterally with respect to the volume of slurry 304. As the forming mold 306 and the forming screen 308 are removed from the volume, some of the excess slurry 304 may come off of the wet part 302. However, the wet part 302 may have a relatively high concentration of liquid.

Following the formation of the wet part 302 on the forming screen 308 and movement of the forming screen 308 and the wet part 302 out of the volume of slurry 304, the transfer tool 320 may be moved such that the transfer screen 324 may contact the wet part 302 on the forming screen 308. That is, for instance, the transfer mold 322 may be attached to a movable mechanism (not shown), in which the movable mechanism may cause the transfer mold 306 and the transfer screen 324 to move toward the forming screen 308. In some examples, the transfer tool 320 may be moved to cause the transfer screen 324 to be in contact with the wet part 302 prior to the wet part 302 being de-watered while on the forming screen 308, e.g., within a few seconds of the wet part 302 being removed from the volume of slurry 304. In one regard, the transfer tool 320 may engage the wet part 302 relatively quickly after formation of the wet part 302, which may enable the transfer tool 320 to remove the wet part 302 relatively quickly and the forming tool 300 to be inserted into the volume of slurry 304 to form a next wet part 302.

In addition, the transfer tool 320 may be in communication with a plenum to which a vacuum source may connected such that the vacuum source may apply a vacuum pressure through the pores 326, 328 while the wet part 302 is in contact with the transfer screen 324. The vacuum source may be the same or a different vacuum source to which the forming tool 300 may be in communication. The vacuum pressure applied through the forming tool 300 may be terminated while the vacuum pressure is applied through the transfer tool 320.

FIG. 3C shows a state in which the transfer tool 320 is in the process of removing the wet part 302 from the forming screen 308. Particularly, in that figure, the transfer screen 324 has been moved into contact with the wet part 302 and a vacuum pressure has been applied onto the wet part 302 through the transfer screen 324. In addition, while the vacuum pressure is applied onto the wet part 302, the transfer tool 320 may be moved away from the forming tool 300 (or the forming tool 300 may be moved away from the transfer tool 320) to pull the wet part 302 off of the forming screen 308. To further facilitate removal of the wet part 302 from the forming screen 308, air pressure may be applied through the forming tool 300 as denoted by the arrows 334. As such, the wet part 302 may be biased toward the transfer tool 320 as opposed to being biased toward the forming tool 300. While the wet part 302 is biased toward the transfer tool 320, the transfer tool 320 may be moved away from the forming tool 300 such that the transfer tool 320 may remove the wet part 302 from the forming tool 300. In FIG. 3C, the forming tool 300 and the transfer tool 320 have been rotated 180° from their respective positions in FIGS. 3A and 3B. It should, however, be understood that the transfer mold 322 may remove the wet part 302 from the forming screen 308 while the forming tool 300 and the transfer tool 320 are in other orientations.

As shown in FIG. 3B, the transfer screen 324 may include pores 328 across multiple surfaces of the transfer screen 324. In some examples, the pores 328 may be positioned deterministically in the transfer screen 324 to cause pressure to be applied substantially evenly across the transfer screen 324 when the vacuum pressure is applied. As a result, pressure may be applied substantially evenly across the surface of the wet part 302 that is in contact with the transfer screen 324. This may prevent the application of increased pressure at a particular location on the surface of the wet part 302, which may prevent the wet part 302 from being damaged by the application of the pressure onto the wet part 302 through the transfer screen 324. Additionally, this may enable the transfer tool 320 to remove wet parts 302 having a vertically or substantially vertically extending (e.g., zero draft) surface (or surfaces) from the forming screen 308 as the pressure may be sufficient to overcome frictional and other forces applied by the forming screen 308 onto the wet part 302.

When the wet part 302 is in contact with the transfer screen 324, the wet part 302 may include some of the liquid from the slurry 304. In addition, when the vacuum pressure is applied through the pores 326, 328, some of the liquid in the wet part 302 may be suctioned through the pores 326, 328 and may flow into the plenum as denoted by the arrows 314. In one regard, the application of the vacuum pressure through the pores 326, 328 may de-water the wet part 302 by removing some of the liquid from the wet part 302. As a result, when the wet part 302 undergoes drying, for instance, in an oven, the amount of energy and/or the amount of time to dry the wet part 302 may significantly be reduced.

As the liquid flows through the pores 326, 328, the material elements in the wet part 302 may be prevented from flowing through the pores 328 in the transfer screen 324. That is, the pores 328 may have sufficiently small dimensions, e.g., diameters or widths, that may enable the liquid to flow through the pores 328 while blocking the material elements from flowing through the pores 328. In one regard, the diameters or widths of the pores 328 may be sized based on sizes of the material elements, e.g., fibers, in the slurry 304. By way of particular example, the pores 312 may have diameters of around 0.6 mm.

According to examples, the pores 310, 312 may respectively be positioned in the forming mold 306 and the forming screen 308 and may have properties, e.g., sizes and/or shapes, such that the wet part 302 may be formed with predefined characteristics. For instance, the pores 310, 312 may be positioned and may have certain properties to cause the wet part 302 to be formed to have an intended thickness (or thicknesses) throughout the wet part 302. By way of particular example, the pores 310, 312 may be positioned and may have certain properties to cause thicknesses of the wet part 302 to be consistent throughout the wet part 302. As another example, the pores 310, 312 may be positioned and may have certain properties to cause the wet part 302 to be formed without an area having a thickness that is below a certain threshold thickness, e.g., a thickness at which a weak point may be formed in the wet part 302. As discussed herein, the locations of the pores 310, 312, 326, 328 may be determined through use of the anchor points 210a of the first type and/or anchor points 210b of the second type as discussed herein.

According to examples, the pores 328 in the transfer screen 324 may have properties, e.g., sizes and/or shapes, such that pressure may be applied onto the wet part 302 as described herein when a vacuum pressure is applied through the pores 328. For instance, the pores 328 may be positioned and may have certain properties to cause pressure to be evenly applied across multiple surfaces of the wet part 302. As other examples, the pores 328 may be positioned and may have certain properties to enable sufficient pressure to be applied across the multiple surfaces of the wet part 302 to suction liquid from the wet part 302 without, for instance, damaging the wet part 302. In one regard, through application of substantially even pressure across multiple surfaces of the wet part 302, the transfer screen 324 may be employed to remove a wet part 302 having a substantially vertical surface. In this regard, at least one of the multiple surfaces of the transfer screen 324 may extend substantially vertically (e.g., have a substantially zero draft) when removing the wet part 302 from the forming screen 308.

Figure 3D:
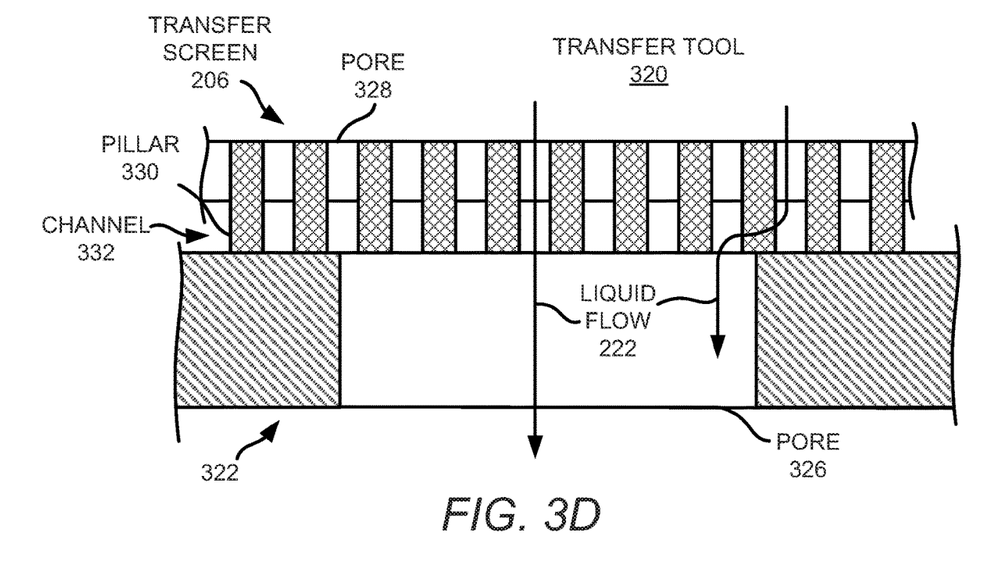
FIG. 3D shows an enlarged cross-sectional view of a section of the example transfer tool shown in FIG. 3B.

In addition, and as shown in FIG. 3D, a plurality of structural features, such as pillars 330, may be provided between the surfaces of the transfer mold 322 and the transfer screen 324 that are respectively adjacent and face each other to enable liquid to flow laterally between the transfer mold 322 and the transfer screen 324. As some of the pores 328 in the transfer screen 324 do not directly align with the pores 326 in the transfer mold 322, the channels 332 formed by the structural features 330 may enable liquid to flow through those pores 328 in addition to the pores 328 that are directly aligned with respective pores 326 in the transfer mold 322. The channels 332 may thus enable pressure to be applied through a larger number of the pores 328 and thus cause liquid to flow through the larger number of the pores 328 while enabling the space between the transfer screen 324 and the transfer mold 322 to be relatively small, e.g., minimized. The structural features 330 may be formed on the transfer screen 324 and/or the transfer mold 322.

Figure 4:
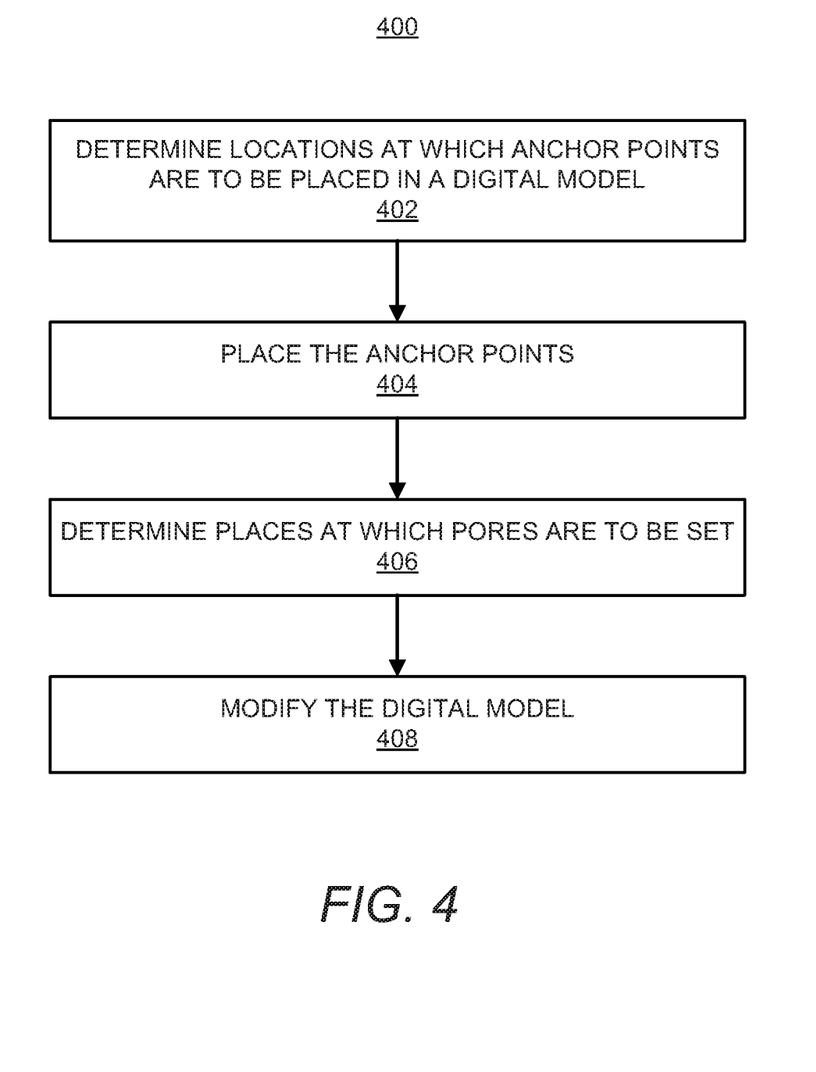
FIG. 4 shows a flow diagram of an example method for determining placements of pores in an item to be fabricated by a 3D fabrication system based on placements of anchor points.

Turning now to FIG. 4, there is shown a flow diagram of an example method 400 for determining placements of pores 212 in an item 206 to be fabricated by a 3D fabrication system 208 based on placements of anchor points 210a, 210b. It should be understood that the method 400 depicted in FIG. 4 may include additional operations and that some of the operations described therein may be removed and/or modified without departing from the scope of the method 400. The description of the method 400 is also made with reference to the features depicted in FIGS. 1-3D for purposes of illustration. Particularly, the processor 202 depicted in FIG. 2 may execute some or all of the operations included in the method 400 using the elements depicted in FIGS. 2-3D.

At block 402, the processor 202 may determine locations of a digital model 204 of an item 206 to be fabricated by a three-dimensional (3D) fabrication system 208 at which a plurality of anchor points 210a, 210b are to be placed, in which the anchor points 210a, 210b may include points that remain in place during a placement determination of pores 212 on the digital model 204 of the item 206. The anchor points 210a, 210b may correspond to locations at which pores 212 are or are not to be formed in the digital model 204. Additionally, the item 206 may correspond to a device that may be implemented in the formation of a wet part 302 from a slurry, such as a forming mold 306, a forming screen 308, a transfer mold 322, and a transfer screen 324.

At block 404, the processor 202 may place the plurality of anchor points 210a, 210b at the determined locations of the digital model 204. At block 406, the processor 202 may determine places on the digital model 204 at which the pores 212 are to be set in the digital model 204, in which the processor 202 may place the pores 212 to comply with a predefined constraint with respect to the anchor points 210a, 210b and to other pores 212. In addition, at block 408, the processor 202 may modify the digital model 204 to place the pores 212 at the determined places in the digital model 204 to add pores 212 at the anchor points 210a, 210b that correspond to pores 212 in the digital model 204.

The processor 202 may also send a modified digital model 230 to the 3D fabrication system 208, in which the 3D fabrication system 208 is to fabricate the item 206 with the plurality of pores 212 at the determined placements.

Some or all of the operations set forth in the method 400 may be contained as utilities, programs, or subprograms, in any desired computer accessible medium. In addition, the method 400 may be embodied by computer programs, which may exist in a variety of forms. For example, the method 400 may exist as computer-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 5:
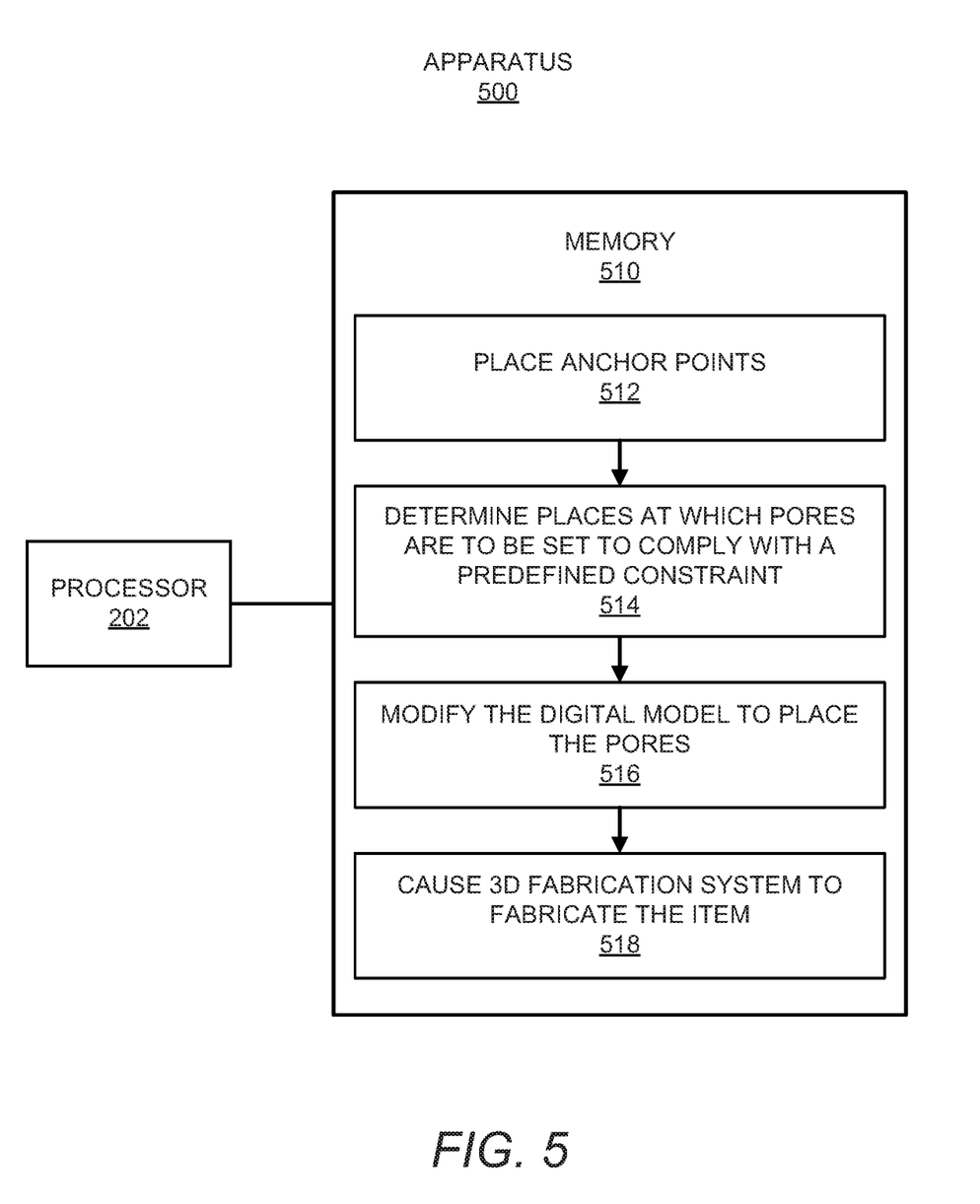
FIG. 5 shows a block diagram of an example apparatus that may that may determine placements of pores in an item to be fabricated by a 3D fabrication system based on placements of anchor points.

Reference is now made to FIG. 5, which shows a block diagram of an example apparatus 500 that may determine placements of pores 212 in an item 206 to be fabricated by a 3D fabrication system 208 based on placements of anchor points 210a, 210b. It should be understood that the example apparatus 500 depicted in FIG. 5 may include additional features and that some of the features described herein may be removed and/or modified without departing from the scopes of the apparatus 500. The description of the apparatus 500 is made with reference to FIGS. 1-3D for purposes of illustration.

The apparatus 500 may be a computing system such as a laptop computer, a tablet computer, a desktop computer, a smartphone, or the like. As shown, the apparatus 500 may include the processor 202. The apparatus 500 may also include a memory 510 that may have stored thereon machine-readable instructions (which may equivalently be termed computer-readable instructions) that the processor 202 may execute. The memory 510 may be an electronic, magnetic, optical, or other physical storage device that contains or stores executable instructions. The memory 510 may be, for example, Random-Access memory (RAM), an Electrically Erasable Programmable Read-Only Memory (EEPROM), a storage device, an optical disc, and the like. The memory 510, which may also be referred to as a computer-readable storage medium, may be a non-transitory machine-readable storage medium, where the term "non-transitory" does not encompass transitory propagating signals.

As shown in FIG. 5, the memory 510 may have stored thereon machine-readable instructions 512-518 that the processor 202 may execute. Although the instructions 512-518 are described herein as being stored on the memory 510 and may thus include a set of machine-readable instructions, the apparatus 500 may include hardware logic blocks that may perform functions similar to the instructions 512-518. For instance, the processor 202 may include hardware components that may execute the instructions 512-518. In other examples, the apparatus 500 may include a combination of instructions and hardware logic blocks to implement or execute functions corresponding to the instructions 512-518. In any of these examples, the processor 202 may implement the hardware logic blocks and/or execute the instructions 512-518. As discussed herein, the apparatus 500 may also include additional instructions and/or hardware logic blocks such that the processor 202 may execute operations in addition to or in place of those discussed above with respect to FIG. 5.

The processor 202 may execute the instructions 512 to place a plurality of anchor points 210a, 210b at determined locations of a digital model 204 of an item 206 to be fabricated. The anchor points 210a, 210b may include points that remain in place during a placement determination of pores 212 in the digital model 204 of the item 206. In addition, the anchor points 210a, 210b may correspond to locations at which pores 212 are or are not to be formed in the digital model 204.

The processor 202 may execute the instructions 514 to determine places at which the pores 212 are to be set in the digital model 204 of the item 206, in which the pores 212 may be set to comply with a predefined constraint with respect to each other and the anchor points 210a, 210b. The processor 202 may execute the instructions 516 to modify the digital model 204 to place the pores 212 at the determined places and to add pores 212 at the anchor points 210a, 210b that correspond to pores 212 in the digital model 204. The processor 202 may execute the instructions 518 to cause a three-dimensional fabrication system 208 to fabricate the item 206 according to the modified digital model 230.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A non-transitory computer-readable medium on which is stored machine-readable instructions that when executed by a processor, cause the processor to:
   place a plurality of anchor points at determined locations of a digital model of an item to be fabricated by a three-dimensional (3D) fabrication system, wherein the anchor points comprise points that remain in place during a placement determination of pores in the digital model of the item, and wherein the anchor points correspond to locations at which pores are or are not to be formed in the digital model;
   determine places at which the pores are to be set in the digital model of the item, wherein the pores are to be placed to comply with a predefined constraint with respect to each other and the anchor points; and
   modify the digital model to place the pores at the determined places in the digital model and to add pores at anchor points that correspond to pores in the digital model.

2. The non-transitory computer-readable medium of claim 1, wherein the instructions are further to cause the processor to:
   determine the locations at which the plurality of anchor points are to be placed as including:
      a location of the digital model having an inner radius of curvature that falls below a predefined radius; and/or
      a location of the digital model having a dimension that is below a predefined size.

3. The non-transitory computer-readable medium of claim 1, wherein the instructions are further to cause the processor to:
   determine that the digital model comprises a first portion and a second portion, the second portion being a mirror copy of the first portion;
   determine an axis of symmetry between the first portion and the second portion; and
   place the plurality of anchor points at determined locations along the determined axis of symmetry.

4. The non-transitory computer-readable medium of claim 1, wherein the instructions are further to cause the processor to:
   identify a portion of the digital model having a first surface, wherein the first surface includes a dimension that is below a predefined size;
   place an anchor point on the first surface;
   extend a channel from the anchor point through the identified portion; and
   place a pore that extends into the channel along the identified portion.

5. The non-transitory computer-readable medium of claim 1, wherein the predefined constraint comprises a constraint to space the pores with respect to each other and the anchor points at distances greater than a predefined distance while maximizing a number of the pores in the digital model, a constraint to cause a molded fiber part to be formed accurately, and/or a combination thereof.

6. The non-transitory computer-readable medium of claim 1, wherein each of the plurality of anchor points comprises a first type of anchor point or a second type of anchor point, and wherein the first type of anchor point corresponds to a location at which a pore is to be formed and the second type of anchor point corresponds to a location at which a pore is not to be formed.

7. The non-transitory computer-readable medium of claim 1, wherein the item to be fabricated comprises a forming mold, a forming screen to be removably mounted to the forming mold, a transfer mold, a transport screen to be removably mounted to the transfer mold, or a combination thereof for use in forming a wet part from a slurry of a liquid and material elements and wherein the instructions are further to cause the processor to:
   send the modified digital model to the 3D fabrication system to fabricate the item based on the modified digital model.

8. A method comprising:
   determining, by a processor, locations of a digital model of a molded fiber screen to be fabricated by a three-dimensional (3D) fabrication system at which a plurality of anchor points are to be placed, wherein the anchor points comprise points that remain in place during a placement determination of pores on the digital model of the molded fiber screen, and wherein the anchor points correspond to locations at which pores are or are not to be formed in the digital model;
   placing, by the processor, the plurality of anchor points at the determined locations of the digital model;
   determining, by the processor, places on the digital model at which the pores are to be set in the digital model, wherein the pores are to be placed to comply with a predefined constraint with respect to the anchor points and to other pores; and
   modifying, by the processor, the digital model to place the pores at the determined places in the digital model to add pores at the anchor points that correspond to pores in the digital model.

9. The method of claim 8, further comprising:
   determining the locations of the digital model at which the plurality of anchor points are to be placed as including:
      a location of the digital model having an inner radius of curvature that falls below a predefined radius; and/or
      a location of the digital model having a dimension that is below a predefined size.

10. The method of claim 8, wherein the predefined constraint comprises a constraint to space the pores with respect to each other and the anchor points at distances greater than a predefined distance, a constraint to cause a wet part to be formed accurately, and/or a combination thereof.

11. The method of claim 8, wherein each of the plurality of anchor points comprises a first type of anchor point or a second type of anchor point, wherein the first type of anchor point corresponds to a location at which a pore is to be formed and the second type of anchor point corresponds to a solid portion, the method further comprising:
modifying the digital model by adding the pores in the digital model at the anchor points of the first type; and
preventing addition of pores in the digital model at the anchor points of the second type.

12. The method of claim 8, further comprising:
determining that the digital model comprises a first portion and a second portion, the second portion being a mirror copy of the first portion; and
determining an axis of symmetry between the first portion and the second portion; and
placing the plurality of anchor points at determined locations along the determined axis of symmetry.

13. An apparatus comprising:
a processor: and
a memory on which is stored machine-readable instructions that are to cause the processor to:
place a plurality of anchor points at determined locations of a digital model of an item to be fabricated, wherein the anchor points comprise points that remain in place during a placement determination of pores in the digital model of the item, and wherein the anchor points correspond to locations at which pores are or are not to be formed in the digital model;
determine places at which the pores are to be set in the digital model of the item, wherein the pores are to be set to comply with a predefined constraint with respect to each other and the anchor points;
modify the digital model to place the pores at the determined places and to add pores at the anchor points that correspond to pores in the digital model; and
cause a three-dimensional fabrication system to fabricate the item according to the modified digital model.

14. The apparatus of claim 13, wherein each of the plurality of anchor points comprises a first type of anchor point or a second type of anchor point, wherein the first type of anchor point corresponds to a location at which a pore is to be formed and the second type of anchor point corresponds to a solid portion, and wherein the instructions are further to cause the processor to:
modify the digital model to add the pores in the digital model at the anchor points of the first type; and
prevent addition of holes in the digital model at the anchor points of the second type,
wherein the item to be fabricated comprises a forming mold, a forming screen to be removably mounted to the forming mold, a transfer mold, a transport screen to be removably mounted to the transfer mold, or a combination thereof for use in forming a wet part from a slurry of a liquid and material elements.

* * * * *